Patented Jan. 31, 1939

2,145,594

UNITED STATES PATENT OFFICE 2,145,594

SEED DISINFECTANT COMPOSITION AND METHOD OF MAKING SAME

Karl Görnitz, Teltow, and Willy Harnack and Otto Wurm, Berlin-Friedrichshagen, Germany, assignors to Schering-Kahlbaum A. G., Berlin, Germany, a corporation of Germany No Drawing. Application September 25, 1935, Serial No. 42,026. In Germany September 28, 1934

13 Claims. (Cl. 167—38)

This invention relates to seed disinfectant compositions and more particularly to seed disinfectant compositions containing certain organic derivatives of mercury.

It is known that certain organic mercury compounds are suitable seed disinfectants. Now, it has been found, that organic mercury compounds of the structural formula

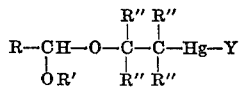

wherein Y represents an acid radical, such as acetoxy, halogen, nitrate or the like, R′ either hydrogen or a substituted or non-substituted hydrocarbon radical, such as alkyl, aryl, aralkyl or an alicyclic radical and the like, R″ either hydrogen or the same or different hydrocarbon radicals which may be arranged in such a manner that they form a nucleus, and which may also be substituted, and R a halogenated hydrocarbon radical, such as alkyl, aryl, or an alicyclic radical and the like, or a trihalogeno methyl group and the like, are far more effective against diseases of small grain, especially when used as dust disinfectants for seeds.

Suitable compositions may be prepared by mixing said organic mercury compounds with a diluent, such as finely divided clay, chalk, talcum, kaolin, kieselguhr, and the like. To these compositions there may also be added other fungicides, stimulating agents, compounds capable of increasing their adhesiveness, agents to prevent dusting, and the like.

Of course, one may prepare such compositions by a one-step process in the course of the manufacturing process of said new compounds as it is described and claimed in our copending application Serial No. 42,027, filed September 25, 1935 and relating to "Organic mercury compounds and a method of producing the same". For this purpose the reaction between the mercury salt, an unsaturated organic compound having an ethylene linkage, and an aldehydic carbonyl compound is carried out in the presence of the diluent and/or the other ingredients of the composition.

In said copending application we have described a reaction involving an organic compound having an ethylene linkage and resulting in the breaking of the double bond and the linking in of the mercury salt radical on one carbon, and the aldehydic carbonyl on the other carbon of the ethylene group. The reaction may be expressed by the following equation:

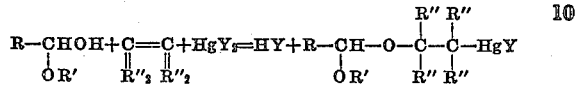

wherein Y represents an acid radical, R a halogenated alkyl radical, and R′ and R″ represent hydrogen or hydrocarbon radicals.

More specifically, if one mixes chloral hydrate, for example, with mercury acetate, warms the mixture and passes ethylene gas into the same, a reaction takes place which may be represented as follows:

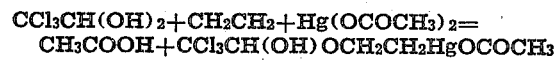

When an organic hydroxy compound, such as an alcohol is added to the reaction mass, it reacts with the aldehydic carbonyl compound to form a hemi-acetal. For example, when ethyl alcohol is added to the above mixture a reaction with chloral hydrate takes place as follows:

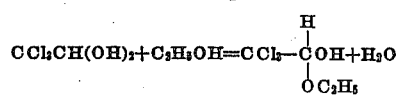

The resulting hemi-acetal then enters into the reaction with the ethylene and the mercury salt.

The following table serves to illustrate the invention without, however, limiting the same to them. It gives a summary of the effectiveness of some of the compounds claimed in comparison with known mercury seed disinfectants. The products were used in a concentration of 1.5 parts of the seed disinfectant to 1000 parts of the seed to be treated. The mercury content set forth in the table represents the amount of mercury calculated to the metallic state, and present in each composition. The figures indicate the number of seeds which were infected by Fusarium; thereby for each experiment 100 grains were used.

| Treated with a composition containing an inert diluent and— | Badly infected | Considerably infected | Total |
|---|---|---|---|
| | | | Percent |
| Untreated | 41 | 34 | 75 |
| α-Trichlor-β-ethoxy-β-(acetoxymercuri-ethoxy)-ethane (1.25% Hg-content) | 2 | 18 | 20 |
| α-Trichlor-β-methoxy-β-acetoxymercuri-ethoxy)-ethane (1.25% Hg-content) | 2 | 12 | 14 |
| α-Trichlor-β-isopropyloxy-β-(acetoxymercuri-ethoxy)-ethane (1.5% Hg-content) | 1 | 18 | 19 |
| α-Trichlor-β-butoxy-β-(acetoxymercuri-ethoxy)-ethane (1.5% Hg-content) | 1 | 20 | 21 |
| α-Trichlor-β-isoamyloxy-β-(acetoxymercuri-ethoxy)-ethane (1.5% Hg-content) | 2 | 14 | 16 |
| α-Trichlor-β-methoxy-β-(acetoxymercuri-cyclohexyloxy)-ethane (1.5% Hg-content) | 2 | 20 | 22 |
| α-Trichlor-β-ethoxy-β-(acetoxymercuri-propyloxy)-ethane (1.5% Hg-content) | 2 | 14 | 16 |
| α-Tribrom-β-ethoxy-β-(acetoxymercuri-ethoxy)-ethane (2% Hg-content) | 1 | 14 | 15 |
| α-Trichlor-β-ethoxy-β-(chloromercuri-isopropyloxy)-ethane (2% Hg-content) | 2 | 16 | 18 |

Comparison with known mercury compounds:

| | | | |
|---|---|---|---|
| Ethanol mercury chloride 6% Hg-content | 5 | 14 | 19 |
| Terpinolen mercuri acetate 2% Hg-content | 12 | 31 | 43 |
| Cumarin mercuri chloride 2.5% Hg-content | 4 | 22 | 26 |
| Acetoxy cyclohexyl mercuri chloride 3% Hg-content | 6 | 18 | 24 |
| Standard seed disinfectant as available on the market 2% Hg-content | 2 | 25 | 27 |

Thus, it follows that the new seed disinfectants described and claimed herein are far superior to the known mercury seed disinfectants.

The compositions used for these experiments were obtained, for instance, by intimately mixing 1.25 to 2 parts of mercury compound with 98 to 98.75 parts of kaolin as diluent.

Of course, many changes and variations in the composition of said seed disinfectants may be made by those skilled in the art in accordance with the principles set forth herein and in the claims annexed hereto.

What we claim, is:

1. A seed disinfectant composition, comprising an organic mercury compound of the structural formula

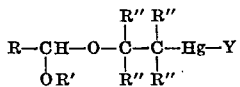

wherein Y represents an acid radical taken from the class consisting of inorganic and lower fatty acids, R a trihalogenated alkyl radical, R' is a radical taken from the class consisting of hydrogen and lower alkyl radicals and R'' is a radical taken from the class consisting of hydrogen and lower saturated hydrocarbon radicals.

2. A seed disinfectant composition according to claim 1, wherein R represents the CCl₃- group.

3. A seed disinfectant composition according to claim 1, wherein R represents the CBr₃- group.

4. A seed disinfectant composition according to claim 1 wherein the

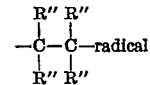

is a saturated aliphatic hydrocarbon radical.

5. A seed disinfectant composition, comprising an α-trichlor-β-alkoxy-β-(acetoxy-mercuri-alkoxy)-ethane of the structural formula

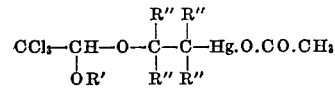

wherein R' is a lower alkyl radical and R'' is a radical taken from the class consisting of hydrogen and lower saturated hydrocarbon radicals.

6. A seed disinfectant composition, comprising an organic mercury compound of the formula

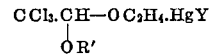

wherein R' is a lower aliphatic saturated hydrocarbon radical and Y is an acid radical taken from the class consisting of inorganic and lower fatty acids.

7. A method of producing a seed disinfectant composition, comprising bringing into contact a soluble mercury salt, an olefinic hydrocarbon, and a trihalogenated aldehydic carbonyl compound in the presence of an inert solid diluent for said composition, whereby a reaction takes place between said three reactants.

8. A method of producing a seed disinfectant composition, comprising bringing into contact a soluble mercury salt, an olefinic hydrocarbon and a compound taken from the class consisting of chloral, its hydrates and its hemiacetals in the presence of an inert solid diluent for said composition, whereby a reaction takes place between said three reactants.

9. A method of producing a seed disinfectant composition, comprising bringing into contact a soluble mercury salt, an olefinic hydrocarbon, and a compound taken from the class consisting of bromal, its hydrates and its hemiacetals in the presence of an inert solid diluent for said composition, whereby a reaction takes place between said three reactants.

10. A method according to claim 7, wherein the mercury salt is the acetate.

11. A method according to claim 7, wherein the hydrocarbon is ethylene.

12. A method according to claim 7, wherein the hydrocarbon is a cyclohexene.

13. A seed disinfectant composition according to claim 1 in which the R'' radicals are interconnected to form a ring.

KARL GÖRNITZ.
OTTO WURM.
WILLY HARNACK.